United States Patent Office 3,075,141
Patented Jan. 22, 1963

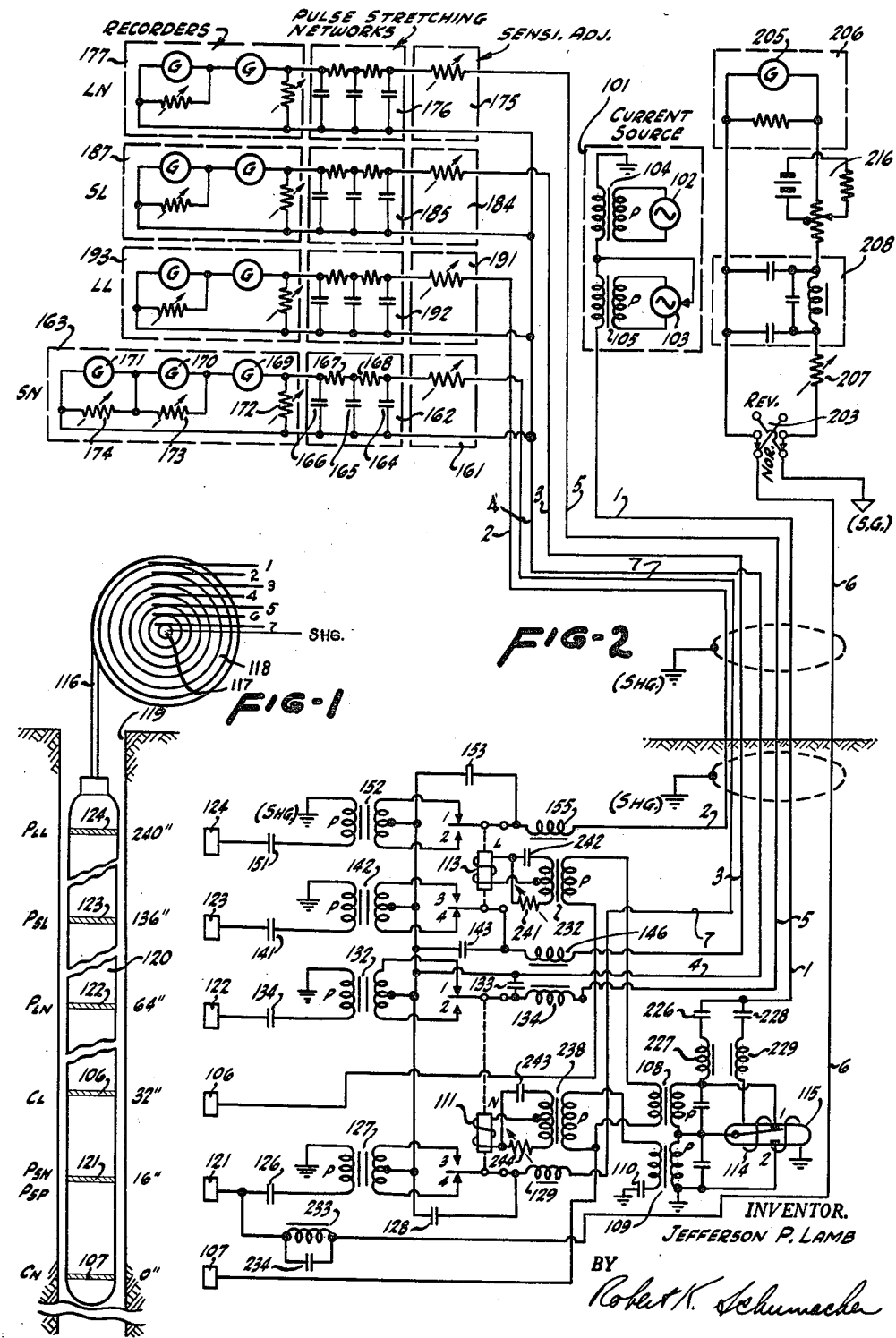

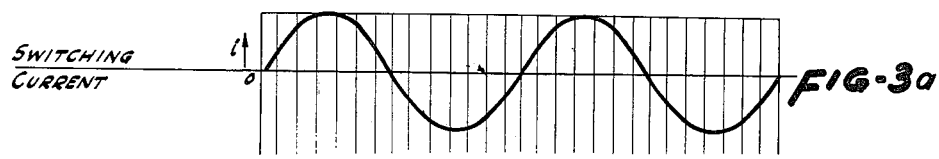
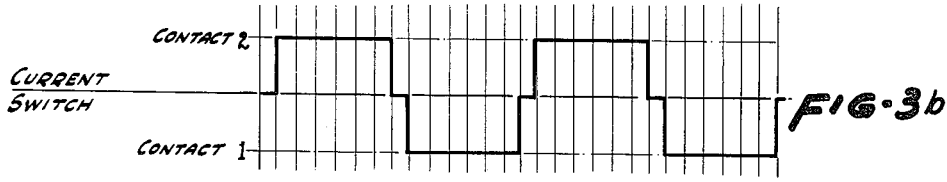
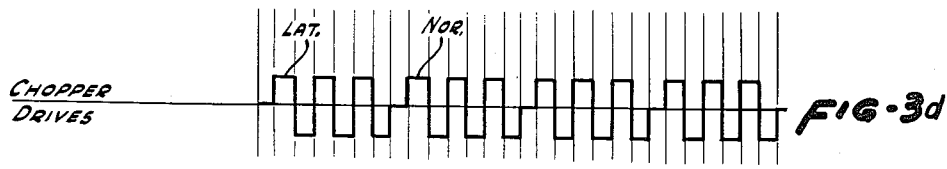
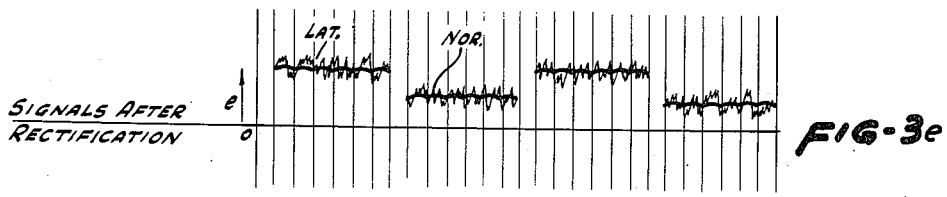
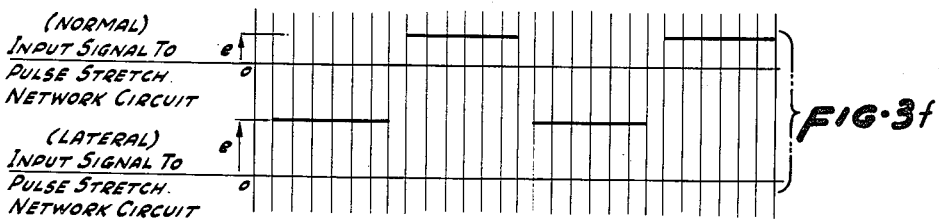
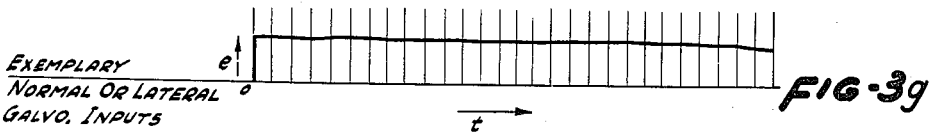

3,075,141
TIME-SHARING ELECTRICAL LOGGING SYSTEM WITH SUBSURFACE COMMUTATION APPARATUS
Jefferson P. Lamb, Tulsa, Okla., assignor, by mesne assignments, to Dresser Industries, Inc., Dallas, Tex., a corporation of Delaware
Filed Dec. 30, 1959, Ser. No. 862,939
3 Claims. (Cl. 324—1)

This invention relates to electrical logging systems, and more particularly to those which utilize time-displaced alternating current fields.

In the field of electrical well logging, it is usually desirable to provide a complex of lateral and normal resistivity curves along with a natural or spontaneous potential curve. As is well known, the normal resistivity curves measure the influence of the formations closely adjacent the borehole on an artificially established current field, while the lateral resistivity curves provide a measure of the influence of formations more remote from the borehole. Aside from the purported usefulness of these different types of parameters, it is a fact that current practice commends a plurality of such curves along with a plot of the natural D.-C. potentials flowing in the subsurface formations. To provide curves representative of the normal and lateral resistivity and of the spontaneous potentials flowing, however, raises a number of problems.

Referencing lateral and normal signals to a common depth or as close to the bullhead of the logging tool as possible is difficult if not impossible when only one field is established, but it is reasonably simple if separate fields are established for the normal and lateral curves. Separate fields are also commended since there are significant level differences between the normal and lateral samples, due mostly to the longer separation between the lateral current and pick up electrodes. These can be compensated for if different amplitude fields are established. While the level differences more often than not exceed ten or so to one, a compromise is usually required between competing factors. As a result, differences between the applied fields of two or three to one are conventional.

In order to provide separate fields for the normal and lateral resistivity curves, many electrical logging systems generate or establish the fields at the surface and transmit them to their respective current electrodes over independent pairs of conductors. This solution, though simple, has the obvious disadvantage of increasing the number of conductors necessary to establish the fields with the concomitant reduction in the number of information-carrying conductors available. A popular cable presently in use includes seven conductors and a sheath; hence, if three are used to provide the artificial fields only four are available to transmit the four resistivity samples and the S.P. sample to surface recording equipment. Even where the sheath is used as a common conductor, it limits the number of curves possible without signal conductor switching.

Other electrical logging systems use various types of subsurface commutation or switching to minimize the number of conductors necessary in any particular case for current and/or information-carrying functions. One example of an extremely versatile time-sharing electrical logging system is disclosed and claimed in my copending application Serial No. 743,380, filed on June 20, 1958. Other partial time-sharing systems are illustrated in Patent 2,779,912, issued to H. C. Waters on January 29, 1957, and Patent 2,728,047, issued to Henri-Georges Doll on December 20, 1955. These latter systems are less versatile but, by the same token, somewhat simpler in design when compared to the system covered by my copending application Serial No. 743,380, in that they employ two-state devices to switch between electrodes. However, none of these systems attack the complex problem involved in designing a subsurface commutating system which performs satisfactorily in terms of resistivity measurements without interfering with and distorting the spontaneous potentials flowing in the formations.

The present invention relates generally to subsurface commutating systems employing two-state devices, but additionally, it seeks to take into account the effect on spontaneous potentials of switching currents and/or information-carrying conductors and electrodes. The bare use of switches for the purpose of subsurface switching is admittedly old. Even so, a dynamic system must be carefully designed if it is to provide a plurality of resistivity curves and a reasonably accurate S.P. curve at the same time. This, prior are systems ignore for the most part.

In the present invention, the lateral and normal alternating current fields are established adjacent the logging tool by utilizing dynamic switching means controlled by a second alternating current source that takes into account the characteristics of the switching means and the logging current frequency to avoid interfering with the natural potentials flowing in the subsurface formations by the production of voltage spikes which may be subsequently integrated by filters in the system. It is known that careless switching of alternating current power produces spurious D.-C. signals which, when they circulate in the formations, interfere with the detection of the true spontaneous potentials. The present invention overcomes this problem of natural potential degradation by employing a mercury type switch and switching integral cycles or otherwise switching whereby the algebraic sum of the positive and negative area of the current wave form establishing a field is always zero. In mercury relays of the desired type, the make and break contacts are momentarily shorted by the liquid mercury as the switch element is operating or releasing. If this shorting or bridging period is selected or designed with care, and if the choice of switching and logging currents are chosen in view of it and other operate and release characteristics of the switch element, it is possible to provide the desired integral cycle switching in a virtually arcless transfer medium.

Aside from the technique by which the logging current is switched between the normal and lateral current electrodes, the components of the present system are quite similar to phase-discriminating and dual frequency systems disclosed and claimed in my copending applications filed on an even date herewith, Serial Nos. 862,737, now Patent No. 3,018,238, and 862,738, now Patent No. 3,027,492, respectively. In all three systems, normal and lateral alternating current fields are established in the subsurface formation adjacent the logging tool, and sampled at a number of points remote from the current establishing electrodes to obtain lateral and normal resistivity measurements. In all cases, these resistivity samples are filtered, synchronously rectified and transmitted to recording equipment at the surface. Along with establishing the alternating current fields and detecting the influence of the formations adjacent the logging tool on these fields, they all provide separate circuits for detecting the spontaneous potential flowing in the subsurface formations and transmitting it to the surface equipment for recording.

Specifically, the lateral and normal receiving channels of the exemplary embodiment of the present invention are substantially the same as those of the phase-discriminating and dual frequency systems mentioned. Then too, the individual recording channels and electrode separations are intentionally similar. The real differences reside in the alternating current sources, the means by which the normal and lateral fields as established, and the filter networks in the recording channels which have to stretch the rectified signals to convert pulse-type samples into continuous signals for application to the recording galvanometers. The electrode array selected for illustrative purposes is in accordance with one popular combination, to wit: 16" and 64" normal curves 10' and 18', 8" lateral curves, and an S.P. curve.

From the foregoing, it is apparent that the principal object of the present invention is to provide a time-sharing electrical logging system wherein the normal and lateral current fields are established by subsurface commutation without interfering with the natural potentials flowing in the formations. The object is attained without unduly complicating the apparatus and circuitry nor adding unreasonably to original cost and maintenance.

Features of the invention pertain to the means for switching the alternating logging current between the lateral and normal current electrodes and substantially eliminating the generation of spurious D.-C. signals. More narrowly, a feature of the invention pertains to the combination in an electrical logging system of means for alternately establishing normal and lateral fields from a single source by integral cycle switching, means for sampling each at a plurality of points adjacent the logging tool, means for synchronously rectifying the detected samples, transmitting means, and means for recording the detected samples.

These and other object and features of the present invention may be more particularly understood when the following detailed description is read with reference to the drawings in which:

FIG. 1 is a schematic representation of the logging tool, current and pick up electrodes and support means;

FIG. 2 is a circuit diagram of an exemplary electrical logging system in accordance with the present invention; and FIG. 3 illustrates wave forms at various points of the system of FIG. 1, correlated along a time axis. More particularly, FIG. 3a represents the alternating current which operates the subsurface commutating device, FIG. 3b represents the alternate operation of the commutating device;

FIG. 3c represents the lateral and normal logging currents as they are established adjacent their respective current electrodes;

FIG. 3d represents the alternations of the synchronous rectifier contacts cooperating with the normal and lateral receiving channels, FIG. 3e represents exemplary normal and lateral signals after rectification, FIG. 3f depicts illustrative inputs to pulse stretching networks associated with normal and lateral receiving channels, and, FIG. 3g represents an exemplary input signal to the recorder in a normal or lateral receiving channel.

FIG. 1 exemplifies a logging tool supported for movement along the extent of the borehole as well as the relative positions of the current and pick-up electrodes employed therewith. The electrodes are marked C (current) or P (pick-up) to indicate their particular functions. The logging tool 120 includes a plurality of electrodes 106, 107 and 121–124, and is supported by a multiconductor cable 116. Cable 116 cooperates with pulley mechanism 117 at the surface to cause the tool 120 to move along the extent of the borehole 119 at times. Commutator device 118 separates the seven conductors and the sheath of the cable 116 for connection to various parts of the surface equipment as illustrated. The means by which the logging tool is caused to traverse the extent of the borehole is not shown in more detail since it forms no part of the present invention; there are many existing means for causing a logging tool to traverse the borehole.

Turning more particularly to the system as illustrated in FIG. 2, the alternating current for controlling the subsurface commutator or switch 115 and for establishing the lateral and normal fields are combined in current source 101 and transmitted over conductor 1 and sheath ground to the subsurface tool 120. More particularly, the switching alternating current source 102 is connected across the primary of a transformer 104, the secondary of which is serially associated with conductor 1, and the alternating logging current source 103 is connected across the primary of a second transformer 105, the secondary of which is serially associated with conductor 1 and the secondary of transformer 104. In the exemplary system disclosed, the switching current frequency chosen is 60 c.p.s. and the logging current frequency is 420 c.p.s. These particular frequencies are dictated by the operate and release charactistics of the switching device employed; however, other switching devices will dictate different relative frequencies in order to provide the integral cycle switching preferred. In the illustrated system, a Model 275a mercury relay, manufactured by the Western Electric Co., or a C. P. Clare Co. equivalent, is used and its characteristics, along with the general desirability of using a logging current in the 400 c.p.s. range, dictate the frequencies selected. The two A.-C. frequency sources 102 and 103 generate the currents at the surface where they are combined and synchronized to maintain their integral relation.

The combined currents from sources 102 and 103 are transmitted over conductor 1 and separated by a pair of series resonant circuits for application to the coil 114 of the commutating relay 115 and to the input side of transformers 108 and 109 in the current, establishing circuit. The switching current resonant circuit includes capacitors 228 and inductance 229 and is tuned to the 60-cycle frequency and rejects any other frequency including that from the current source 102. Contrariwise, the logging current series resonant circuit includes capacitor 226 and inductance 227, and is tuned to pass a band including the 420-cycle current and to reject other frequencies.

The output from the series resonant circuit including capacitor 226 and inductance 227 is connected to one terminal of the primary winding of transformer 108, the other terminal of which is connected through the primary winding of transformer 109 to ground. The common terminal connection between the primary windings of transformers 108 and 109 is connected to the swinger or armature of mercury switch 115. Contacts 1 and 2 of switch 115 are connected, respectively, to the non-common terminal of the primary winding of transformer 108 and to ground. A pair of arcing suppressing capacitors are connected in shunt of the primary windings of transformers 108 and 109. One terminal of the secondary winding of transformer 108 is connected to the lateral current electrode 106 through the primary winding of transformer 232, and the other terminal is connected to the normal current electrode 107. On the other hand, the secondary winding of transformer 109 is connected from ground through a normal decoupling capacitor 110 and the primary winding of transformer 238 to the 0" electrode 107.

As the switching current flows through winding 114 of the commutator device 115 it causes the armature thereof to engage contacts 1 and 2 on alternate half cycles. The logging current flowing through the series resonant circuit including capacitor 226 and inductance 227 is thereby alternately applied in bursts through the primary windings of transformers 109 and 108. For example, when the armature of switch 115 completes a path through contact 1, the logging current flows through the primary of transformer 109. This, in turn, establishes the normal alternating field between electrode 107 and sheath ground. As soon as the armature of switch 115 operates to contact 2, the alternating current is applied through the primary of transformer 108 which, in turn, establishes the lateral current field between the current electrodes 106 and 107.

The timed establishment of and relation between the switching current and the normal and lateral logging currents can be seen most easily in FIGS. 3a, 3b and 3c. FIG. 3a represents the 60-cycle switching current which causes switch 115 to operate and release on positive and negative half-cycles. FIG. 3b indicates the periods during which the armature of switch 115 is in contact with contacts 1 and 2. For the relay employed by way of example, there is approximately a one millisecond blanking period caused by the liquid mercury bridging the contacts during the switching transition. However, the armature of the switch 115 completes a circuit through contact 1 during most of the negative half-cycle of the switching current and through contact 2 during most of the positive half-cycle of the switching current. From this, in conjunction with FIG. 3c, it can be appreciated that the normal logging field is established during the time the armature of switch 115 is in contact with contact 1, and that the lateral logging field is established during the time the armature is in contact with contact 2.

The logging currents establishing in the formations adjacent the logging tool 120, therefore, are alternately the normal and lateral fields separated by the blanking period built into the particular mercury relay employed or intentionally accentuated in some cases by various circuit changes. The logging current illustrated in FIG. 3c also shows the comparative amplitudes of the lateral and normal fields. As is well known, the lateral field should be much stronger since the points of detection for it are further away from the current electrodes with the resulting increased attenuation. This is accomplished by selection of different ratios for transformers 108 and 109.

Each time the normal field is established through transformer 109 it operates the synchronous rectifier 111 which cooperates with the short and long normal receiving channels. The establishment of the normal field causes the current to flow through the primary of transformer 238 which in turn energizes the coil of synchronous rectifier 111. One terminal of the synchronous rectifier coil is connected to the center tap of the secondary winding of transformer 238 and its other terminal is connected to the terminals of the secondary winding of transformer 238 through capacitor 243 and variable resistor 244, respectively. Since there is an inherent delay between the energization of the coil and the closure of the contacts, the cooperating resistor 244 can be varied to synchronize the rectification action of the contacts with the half-cycles of the normal current. In a comparable manner, current flow through the secondary winding of transformer 108, as the lateral field is established, induces a current in the secondary winding of transformer 232 which cooperates with the winding of rectifier 113, capacitor 242 and variable ressitor 241. By adjustment of resistor 241 the operation of the armatures associated with rectifier 113 are caused to engage the contacts in synchronism with the establishment of the lateral current half-cycles.

While the normal field is established between electrode 107 and sheath ground, it is detected by electrodes 121 and 122 which are associated with the 16″ and 64″ normal receiving signals, respectively. The L.N. signal detected between electrode 122 and sheath ground flows through a D.-C. blocking capacitor 134 and the primary winding of 132 to ground. The terminals of the secondary winding of transformer 132 are connected, respectively, to contacts 1 and 2 associated with the rectifier 111 so that the signal is synchronously rectified and applied through a low pass filter (inductor 134 and capacitor 133) to cable conductors 4 and 5 for transmission to the surface recording equipment. In a similar manner, the S.N. signal detected by electrode 121 traverses capacitor 126 and the primary winding of transformer 127 to ground. The secondary winding of transformer 127 is connected at its terminals to contacts 3 and 4 of rectifier 111, which synchronously rectifies the detected signal. The rectified signal is then passed through a low pass filter (inductance 129 and capacitor 128) and connected to cable conductors 4 and 7 for transmission to the surface recording equipment. During the time the lateral current field is established, lateral resistivities are detected by electrodes 123 and 124. The signals are passed, respectively, through capacitors 141 and 151 and transformers 142 and 152, which perform functions comparable to those performed by capacitor 134 and the transformer 132 in the long normal channel. The secondary windings of transformers 142 and 152 are associated with the contacts 1–4 of rectifier 113, and the rectified outputs are connected through low pass filters, including inductances 146 and 155 and capacitors 143, 153, to selected cable conductors for transmission to the surface recording equipment. Specifically, the short lateral sample detected by electrode 123 is filtered, transformed, rectified, filtered again, and applied to conductors 3 and 4, whereas the long lateral sample, detected by electrode 124, is applied to cable conductors 2 and 4.

The normal and lateral samples, which are obtained during the establishment of their respective current fields, are applied to the inputs of their respective recording channels located at the surface equipment. The short normal sample—transmitted to the surface equipment between conductors 4 and 7 is passed through a sensitivity adjustment 161 and a pulse-stretching and filtering network 162 to a recorder 163. The sensitivity adjustment circuit 161 is merely a variable resistor or comparable device to vary the sensitivity of the short normal channel. The pulse-stretching network 162 includes capacitors 164–6 and resistors 167 and 168, arranged as a double pi filter to extend or stretch the short normal sample over the period in which the lateral field, not the normal field, is established. The D.-C. output from the pulse-stretching network 162 is applied to the recorder 163 which includes galvanometers 169, 170, and 171, and variable resistances 172, 173 and 174. Conventionally, these galvanometers are employed to provide an amplified reading, a unitary reading, and a fractional reading of the formation resistivity, although one galvanometer or other recording device would be satisfactory. In a comparable manner, the long normal sample—transmitted to the surface over conductors 4 and 5—is connected through sensitivity adjustment 175 and pulse stretching network 176 to recorder 177.

Turning to the lateral samples, the short lateral is transmitted over conductors 3 and 4 to its recording channel, which includes a sensitivity adjustment 184, pulse-stretching network 185 and recorder 187. The long lateral sample is transmitted over conductors 2 and 4 to its receiving channel including sensitivity adjustment 191, pulse-stretching network 192 and recorder 193.

In the case of all receiving channels associated with surface equipment, the sensitivity adjustments and pulse-stretching networks are similar, as are the recorders 163, 177, 187 and 193. They differ from each other only in the component values which, in turn, depend on the relative magnitudes of the normal and lateral currents and signals.

In order to provide a spontaneous potential curve, it is detected between the 16″ electrode 121 and surface ground and passed through the logging current rejection filter including inductance 233 and capacitor 234 and conductor 6 to the natural potential receiving channel. The signal is connected through reversing switch 203, sensitivity adjustment 207, low pass filter 208 and buck-boost circuit 216 to the recorder 206, the latter including a recording galvanometer 205. The reversing switch 203 is to permit a reversal of the polarity of the signal applied to the recording galvanometer 205 so that it can be kept on scale.

While FIGS. 3a through 3c have been explained above, FIGS. 3d–3g illustrate various operations in the signal channels. FIG. 3d illustrates the synchronous operation of the normal and lateral rectifiers 111 and 113, explained above, while FIG. 3e indicates exemplary normal and lateral signals after rectification with superimposed noise and other interfering signals thereon. Since the rectifiers 111 and 113 synchronously rectify the detected signals, any extraneous signals picked up in the receiving channels are chopped into alternating current signals and appear as some form of distorted superimposed A.-C. The filters following the rectification, in cooperation with the surface filters, eliminate the unwanted A.-C. signals from the rectified information-bearing ones. Typical input signals to the pulse-stretching networks in a normal or lateral receiving channels are illustrated in FIGS. 3f—after the "hash" has been eliminated. Finally, FIG. 3g exemplarily illustrates an output from one of the pulse-stretching networks after the network has extended the discontinuous or pulse signal to make it approximate a continuous or D.-C. signal.

While the preferred embodiment of the present invention has been described with respect to integral cycle switching, it is not the only way to obtain the benefits of the invention. As long as the total area under the positive portion of the waveform current establishing each field is equal to the area under the negative portion, the benefit of integral cycle switching is obtained. If a switch unit is employed which does not have characteristics to provide half-cycle blanking when the frequencies are 60 and 420 c.p.s. or if a lower frequency logging current is to be employed, it is necessary to balance the blanking period to provide equal areas under the positive and negative portions of each current waveform. This will cause the algebraic sum of the positive and negative areas of the waveform of the current establishing the field always to be zero. Any reference to integral cycle switching in the claims, therefore, should be interpreted to include this other balanced arrangement.

Aside from the integral cycle switching feature, the present electrical logging system has been disclosed in connection with a particular circuit, and it should be apparent to persons skilled in the art that other arrangements of the circuit components and electrode spacings are possible without departing from the spirit and scope of the invention. In this connection, it is possible to employ fewer conductors, provide differently spaced curves, vary the blanking cycles, etc. without departing from the basic concept of providing an electrical logging system wherein two or more alternating current fields are established on a time-sharing basis through the use of integral or balanced cycle switching.

What is claimed is:

1. A system for obtaining information on the subsurface lithology of formations surrounding a borehole comprising:
 a logging tool including
  a plurality of current establishing means;
  means to move said tool along the extent of said borehole;
  first and second sources of alternating current of different frequencies,
   the frequency of the second current being greater than, and an integral multiple of, the frequency of the first current;
  means to combine the outputs of said sources and transmit them to said logging tool;
  mechanical, integral cycle switching means associated with said logging tool responsive to said first source to connect said second source sequentially to different ones of said current establishing means,
   said switching means including contacts shorted during preselected periods intermediate the operated and released conditions thereof; and
  means remote from said current establishing means to sample the time-displaced fields established by the sequential connection of said second source to different ones of said current establishing means.

2. A system in accordance with claim 1 wherein said switching means is a mercury type switch and its contacts are shorted during said preselected intervals by liquid mercury.

3. A system in accordance with claim 2 wherein the frequencies of said sources are selected in accordance with the operate and release characteristics of said mercury switch to provide at least balanced cycle switching of said second source.

References Cited in the file of this patent

UNITED STATES PATENTS

| | | |
|---|---|---|
| 2,501,953 | Martin | Mar. 28, 1950 |
| 2,617,852 | Waters | Nov. 11, 1952 |
| 2,779,912 | Waters | Jan. 29, 1957 |
| 2,880,389 | Ferre et al. | Mar. 31, 1959 |